(12) United States Patent
Okazaki

(10) Patent No.: US 10,764,969 B2
(45) Date of Patent: Sep. 1, 2020

(54) INDUCTION HEATING DEVICE AND POWER GENERATION SYSTEM

(71) Applicant: Sumitomo Electric Industries, Ltd., Osaka-shi (JP)

(72) Inventor: Toru Okazaki, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 318 days.

(21) Appl. No.: 15/735,824

(22) PCT Filed: Mar. 25, 2016

(86) PCT No.: PCT/JP2016/059691
§ 371 (c)(1),
(2) Date: Dec. 12, 2017

(87) PCT Pub. No.: WO2016/203801
PCT Pub. Date: Dec. 22, 2016

(65) Prior Publication Data
US 2019/0239294 A1 Aug. 1, 2019

(30) Foreign Application Priority Data
Jun. 18, 2015 (JP) .................................. 2015-123353

(51) Int. Cl.
*H05B 6/10* (2006.01)
*F03D 9/22* (2016.01)
(Continued)

(52) U.S. Cl.
CPC ............... *H05B 6/109* (2013.01); *F03D 9/22* (2016.05); *F03D 9/25* (2016.05); *F24H 1/18* (2013.01);
(Continued)

(58) Field of Classification Search
CPC . H05B 6/109; H05B 6/02; H05B 6/10; H05B 6/108; F03D 9/22; F03D 9/25; F03D 9/18; F24H 1/18; Y02E 10/72
(Continued)

(56) References Cited

U.S. PATENT DOCUMENTS 2,265,470 A * 12/1941 Black ..................... H05B 6/108
219/630
2,792,482 A * 5/1957 Logan ..................... H05B 6/06
219/659
(Continued)

FOREIGN PATENT DOCUMENTS

CN 101282671 A 10/2008
JP S58-127558 A 7/1983
(Continued)

*Primary Examiner* — Benjamin R Shaw
(74) *Attorney, Agent, or Firm* — Baker Botts L.L.P.; Michael A. Sartori

(57) ABSTRACT

The induction heating device that heats a heating medium includes a rotor having a rotation shaft, a heating part disposed to be opposed to the rotor at a distance, a magnetic flux generating part provided at the rotor to generate magnetic flux for the heating part, and a flow passage provided along the heating part to allow the heating medium to circulate. The flow passage has an inlet to supply the heating medium on one side in a direction along the heating part and an outlet to discharge the heating medium on the other side. The distance between the magnetic flux generating part and the heating part is larger on the outlet side than on the inlet side of the flow passage.

10 Claims, 14 Drawing Sheets

(51) Int. Cl.
*H05B 6/02* (2006.01)
*F03D 9/25* (2016.01)
*F24H 1/18* (2006.01)
*F03D 9/18* (2016.01)

(52) U.S. Cl.
CPC ............... *H05B 6/02* (2013.01); *H05B 6/10* (2013.01); *H05B 6/108* (2013.01); *F03D 9/18* (2016.05); *Y02E 10/72* (2013.01)

(58) Field of Classification Search
USPC .......................................................... 219/631
See application file for complete search history.

(56) References Cited

U.S. PATENT DOCUMENTS

| | | | | |
|---|---|---|---|---|
| RE24,698 E | * | 9/1959 | Logan | ...................... H05B 6/06 219/659 |
| 3,197,602 A | * | 7/1965 | Armstrong | ............... H05B 6/02 219/659 |
| 2009/0154909 A1 | | 6/2009 | Meyer | |
| 2012/0193924 A1 | * | 8/2012 | Okazaki | ................. H05B 6/108 290/55 |
| 2013/0062340 A1 | * | 3/2013 | Hsu | ........................ H05B 6/108 219/600 |
| 2014/0110938 A1 | * | 4/2014 | Okazaki | ................... F03D 9/22 290/2 |
| 2015/0192109 A1 | * | 7/2015 | Okazaki | ................... F03D 9/25 290/55 |
| 2016/0201650 A1 | * | 7/2016 | Okazaki | ................... F03D 1/06 290/44 |
| 2018/0295678 A1 | * | 10/2018 | Okazaki | ................. H05B 6/04 |

FOREIGN PATENT DOCUMENTS

| | | |
|---|---|---|
| JP | 2000-123962 A | 4/2000 |
| JP | 2005-174801 A | 6/2005 |
| JP | 2011-159595 A | 8/2011 |
| JP | 2011-210656 A | 10/2011 |
| JP | 2012-256507 A | 12/2012 |

* cited by examiner ium using induction heating and a power generation system including the same. More specifically, the present invention relates to an induction heating device that can efficiently transfer heat generated in a heating part to a heating medium circulating through a flow passage.

INDUCTION HEATING DEVICE AND POWER GENERATION SYSTEM

TECHNICAL FIELD

The present invention relates to an induction heating device that heats a heating medium using induction heating and a power generation system including the same. More specifically, the present invention relates to an induction heating device that can efficiently transfer heat generated in a heating part to a heating medium circulating through a flow passage.

BACKGROUND ART

A heating device using induction heating (eddy current) is proposed as a device that heats water (for example, see PTD 1). The eddy current heating device described in PTD 1 includes a rotatable rotor having permanent magnets disposed on the outer periphery thereof and a heating part made of a conductive material that is fixed to the outside of the rotor and has a flow passage inside thereof for circulating water. When the rotor rotates, magnetic field lines (magnetic flux) generated by the permanent magnets on the outer periphery of the rotor move through the heating part to produce eddy current in the heating part and heat the heating part. As a result, heat produced in the heating part is transmitted to the water circulating through the interior flow passage to heat the water.

The main object of the above technology is to supply hot water using energy such as wind power. Power generation systems have recently been proposed, which convert heat of a heating medium heated by an induction heating device into electric energy (see, for example, PTDs 2, 3). PTDs 2, 3 disclose an induction heating device including a rotor, a magnetic flux generating part provided on the outer periphery of the rotor to generate magnetic flux in the radial direction of the rotor, a tubular heating part disposed on the outside of the rotor at a distance from the rotor, and a flow passage (piping) provided in the heating part to allow a heating medium to circulate. PTDs 2, 3 illustrate a configuration having a plurality of flow passages along the axial direction of the heating part, in which a heating medium is supplied from one end side of the flow passages and discharged from the other side.

CITATION LIST

Patent Document

PTD 1: Japanese Patent Laying-Open No. 2005-174801
PTD 2: Japanese Patent Laying-Open No. 2011-159595
PTD 3: Japanese Patent Laying-Open No. 2012-256507

SUMMARY OF INVENTION

Technical Problem

In an induction heating device, it is desired to efficiently transfer heat generated in the heating part to the heating medium circulating through the flow passage.

For example, in a conventional induction heating device including a magnetic flux generating part on the outer periphery of a rotor and a heating part disposed on the outside of the rotor, a flow passage is formed such that a heating medium circulates from one side to the other side in the axial direction of the heating part. In the conventional induction heating device, in general, the distance between the magnetic flux generating part and the heating part is substantially constant in the axial direction, and the heating part generates heat uniformly in the axial direction by induction heating. That is, the amount of heat generation per unit length in the axial direction of the heating part is substantially equal. The heating medium flows through the flow passage while successively receiving heat from the heating part and is thereby gradually heated. Thus, the temperature of the heating medium is higher on the outlet side than on the inlet side (the inlet or the vicinity thereof) of the flow passage and becomes closer to or equal to the temperature of the heating part on the outlet side (the outlet or the vicinity thereof).

Here, the heat transmission ratio h (W/m²·K) between the heating part and the heating medium is defined by the equation below:

$$h = Q/[A(Tw-Ta)] = J/(Tw-Ta)$$

Q: the amount of heat transfer (W)
J: heat flux density (W/m²)
A: heat transfer area (m²)
Tw: temperature (K) of the surface of the heating part
Ta: temperature (K) of the heating medium
where Tw>Ta.

The equation above indicates that the amount of heat transfer Q between the heating part and the heating medium increases as the temperature difference (Tw-Ta) between the heating part and the heating medium is increased or the heat transfer area A is increased. Therefore, on the inlet side of the flow passage, given that the temperature of the heating medium is low and the temperature difference between the heating part and the heating medium flowing through the flow passage is large, the amount of heat transfer is larger. On the other hand, on the outlet side, since the temperature of the heating medium is high and the temperature difference between the heating part and the heating medium is small, the amount of heat transfer is smaller. That is, on the inlet side of the flow passage, the amount of heat transfer is large, and heat is sufficiently transferred from the heating part to the heating medium, whereas on the outlet side of the flow passage, the amount of heat transfer decreases and heat may not be sufficiently transferred from the heating part to the heating medium. Thus, heat generated in the heating part by induction heating may not be transferred efficiently to the heating medium circulating through the flow passage. Moreover, heat generated in the heating part on the outlet side may not be sufficiently removed by the heating medium and, in the worst case, the heating part on the outlet side may be damaged, for example, melted due to overheating.

Then, the amount of heat transfer between the heating part and the heating medium may be increased by increasing the heat transfer area as a whole, for example, by increasing the diameter of the flow passage provided in the heating part. This case, however, leads to increase in size and costs of the device.

The present invention is made in view of the circumstances above, and an object of the present invention is to provide an induction heating device that can efficiently transfer heat generated in the heating part to the heating medium circulating through the flow passage. Another object of the present invention is to provide a power generation system including the induction heating device.

Solution to Problem

An induction heating device according to an aspect of the present invention heats a heating medium. The induction heating device includes: a rotor having a rotation shaft; a heating part disposed to be opposed to the rotor at a distance; a magnetic flux generating part provided at the rotor to generate magnetic flux for the heating part; and a flow passage provided along the heating part to allow the heating medium to circulate. The flow passage has an inlet to supply the heating medium on one side in a direction along the heating part and an outlet to discharge the heating medium on the other side. The distance between the magnetic flux generating part and the heating part is larger on the outlet side than on the inlet side of the flow passage.

A power generation system according to an aspect of the present invention includes: the induction heating device according to an aspect of the present invention as described above; and a power generating part configured to convert heat of the heating medium heated by the induction heating device into electric energy.

Advantageous Effects of Invention

The induction heating device can efficiently transfer heat generated in the heating part to the heating medium circulating through the flow passage. The power generation system can improve the efficiency of heat exchange to the heating medium in the induction heating device and can improve the power generation efficiency.

DESCRIPTION OF EMBODIMENTS

Figure 1:
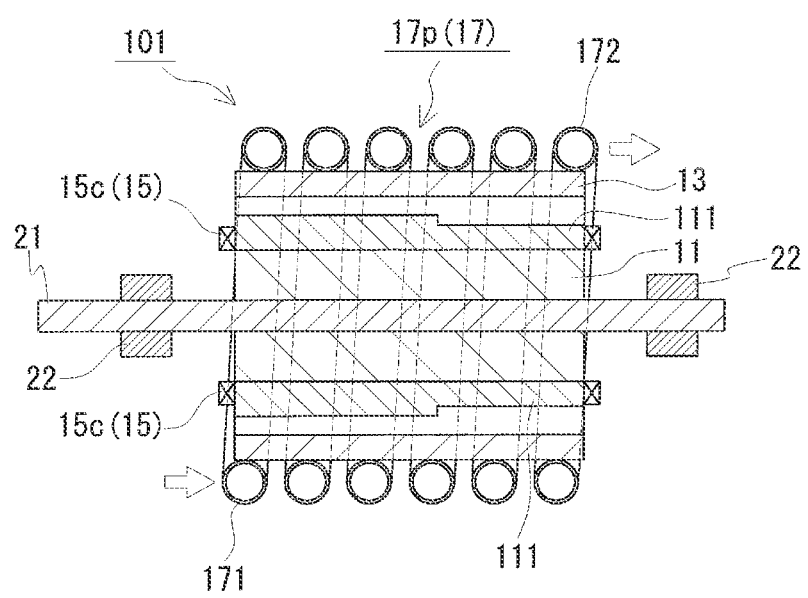
FIG. 1 is a schematic longitudinal cross-section view showing a configuration of an induction heating device according to a first embodiment.

Description of Embodiments of the Present Invention

First of all, embodiments of the present invention will be described one by one below.

(1) An induction heating device according to an aspect of the present invention heats a heating medium. The induction heating device includes: a rotor having a rotation shaft; a heating part disposed to be opposed to the rotor at a distance; a magnetic flux generating part provided at the rotor to generate magnetic flux for the heating part; and a flow passage provided along the heating part to allow the heating medium to circulate. The flow passage has an inlet to supply the heating medium on one side in a direction along the heating part and an outlet to discharge the heating medium on the other side. The distance between the magnetic flux generating part and the heating part is larger on the outlet side than on the inlet side of the flow passage.

The induction heating device is configured such that the distance between the magnetic flux generating part and the heating part is larger on the outlet side than on the inlet side of the flow passage. The amount of heat generation by induction heating (eddy current) is proportional to the square of magnetic field strength, and magnetic field strength attenuates with distance. Given this, the amount of heat generation in the heating part is reduced at a portion where the distance from the magnetic flux generating part is large. Therefore, since the amount of heat generation in the heating part is reduced on the outlet side of the flow passage, the temperature difference between the heating part and the heating medium can be increased, thereby improving the heat transfer efficiency. Accordingly, heat generated in the heating part on the outlet side can be sufficiently transferred to the heating medium, and heat loss from the heating part on the outlet side can be reduced, thereby improving the heating efficiently (heat exchange efficiency) of the heating medium. Thus, heat generated in the heating part can be transferred efficiently to the heating medium circulating through the flow passage, and because of the improvement in efficiency of heat exchange to the heating medium, the induction heating device can be reduced in size and weight. In addition, heat generated in the heating part on the outlet side can be sufficiently removed by the heating medium, thereby suppressing damage to the heating part due to overheating, without size increase or cost increase of the induction heating device.

(2) In an embodiment of the induction heating device, the flow passage may be formed such that a contact area with the heating part is larger on the outlet side than on the inlet side.

According to the embodiment above, the flow passage is configured such that the contact area with the heating part is larger on the outlet side than on the inlet side of the flow passage. That is, in the heating part, the contact area with the flow passage per unit length in the direction of circulation of the heating medium is larger on the outlet side than on the inlet side. Thus, the contact area with the heating part is increased on the outlet side of the flow passage, and the amount of heat transfer from the heating part to the heating medium can be increased. Accordingly, heat generated in the heating part on the outlet side can be sufficiently transferred to the heating medium, thereby improving the efficiency of heat exchange to the heating medium more. Thus, heat generated in the heating part can be transferred more efficiently to the heating medium circulating through the flow passage. In addition, heat generated in the heating part on the outlet side can be sufficiently removed by the heating medium, thereby further suppressing damage to the heating part due to overheating, without size increase or cost increase of the induction heating device.

(3) In an embodiment of the induction heating device, the heating part may be a tubular member provided on an outer circumferential side of the rotor, and the magnetic flux generating part may generate the magnetic flux in a radial direction of the rotor. The flow passage may be provided spirally in an axial direction of the heating part, the inlet being provided on one side in the axial direction of the heating part, the outlet being provided on the other side.

The embodiment above is a radial gap-type structure in which the rotor (magnetic flux generating part) and the heating part are disposed to be opposed to each other at a distance in the radial direction. In the embodiment above, the flow passage is shaped in a spiral form whereby heat generation from the entire heating part can be transferred to the heating medium with a single flow passage.

(4) In an embodiment of the induction heating device according to (3), the flow passage may be formed such that a distance between adjacent flow passage is smaller on the outlet side than on the inlet side.

In the embodiment above, since the flow passage is provided spirally in the axial direction of the heating part and is formed such that the distance between the flow passage is smaller on the outlet side than on the inlet side of the flow passage, the contact area with the heating part is larger on the outlet side than on the inlet side of the flow passage. Thus, on the outlet side of the flow passage, the contact area with the heating part is increased and the amount of heat transfer from the heating part to the heating medium can be increased.

(5) In an embodiment of the induction heating device, the rotation shaft may be connected to a wind turbine.

Although an electric motor or an internal combustion engine such as an engine may be used for motive power for rotating the rotor (rotation shaft), it is preferable to use renewable energy such as wind power, water power, and wave power. The use of renewable energy can suppress production of $CO_2$. Wind power can be used for motor power for the rotor by connecting the rotation shaft to a wind turbine.

(6) A power generation system according to an aspect of the present invention includes the induction heating device of any one of (1) to (5) above; and a power generating part configured to convert heat of the heating medium heated by the induction heating device into electric energy.

Since the power generation system includes the induction heating device according to an embodiment of the present invention, heat generated in the heating part can be efficiently transferred to the heating medium circulating through the flow passage in the induction heating device. Therefore, the efficiency of heat exchange to the heating medium in the induction heating device can be improved, thereby improving the power generation efficiency.

The power generation system generates power using heat of the heating medium heated by the induction heating device. For example, when a wind turbine is connected to the rotation shaft of the induction heating device and wind power is used for motive power for the rotor, wind energy is converted into rotational energy and then into thermal energy, which can be extracted as electric energy. As an example, water serving as a heating medium may be heated to generate high-temperature and high-pressure steam, which is used to allow a steam turbine to rotate a power generator to generate power. With the configuration of converting heat into electric energy, a stable power generation system can be implemented by using a heat accumulator to store energy in the form of heat.

Details of Embodiments of the Present Invention

Specific examples of the induction heating device and the power generation system according to embodiments of the present invention will be described below with reference to the drawings. The same reference signs in the drawings denote the same or corresponding parts. The present invention is not limited to the illustrated examples but shown by the claims, and it is intended that all equivalents to the claims and modifications within the scope of the claims are embraced.

Induction Heating Device

First Embodiment

Figure 2:
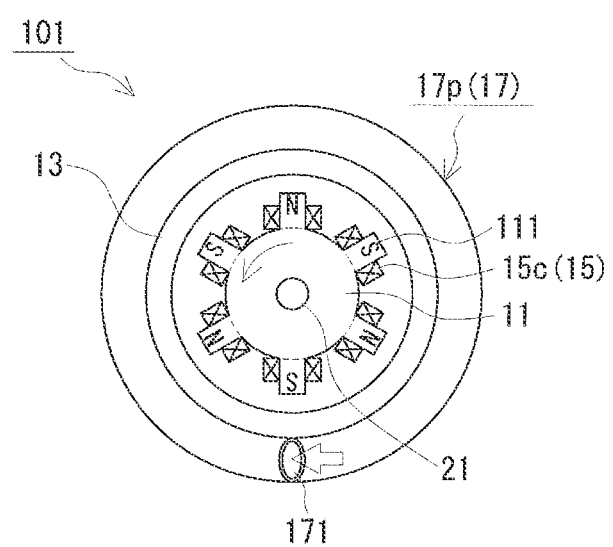
FIG. 2 is a schematic front view showing a configuration of the induction heating device according to the first embodiment.

Referring to FIG. 1 and FIG. 2, an induction heating device 101 according to a first embodiment will be described. Induction heating device 101 includes a rotor 11, a heating part 13, a magnetic flux generating part 15, and a flow passage 17. Induction heating device 101 is a radial gap-type structure in which magnetic flux generating part 15 and heating part 13 are disposed to be opposed to each other at a distance in the radial direction of the rotor 11. The configuration of induction heating device 101 will be described in detail below.

(Rotor)

Rotor 11 is a tubular or column-shaped member having a rotation shaft 21 and coupled to one end side of rotation shaft 21. In this example, a through hole is formed at the center axis of the cylindrical rotor 11, rotation shaft 21 is inserted into the through hole, and rotor 11 is fixed to rotation shaft 21. Rotation shaft 21 is supported rotatably by bearings 22 provided on both end sides of rotor 11 (see FIG. 1). On the outer circumference of rotor 11, a plurality of projections 111 are formed to protrude in the radial direction (see FIG. 2). In this example, six projections 111 are provided, and projections 111 are formed at regular intervals in the circumferential direction. On the outer circumference of rotor 11, a magnetic flux generating part 15 (in this example, coil 15c) is also provided. Here, it is assumed that rotor 11 rotates counter-clockwise (the arrow in FIG. 2 shows the rotation direction). As an example of the power for rotor 11, a wind turbine (not shown) is connected to rotation shaft 21 to provide wind power.

Rotor 11 is formed of any material that has mechanical strength and can support magnetic flux generating part 15, either a magnetic material or a non-magnetic material. Materials excellent in structural strength and long-term durability (weather resistance and corrosion resistance) are preferred. Examples include metals such as iron, steel, stainless steel, aluminum alloy, magnesium alloy for use in structural materials and composite materials such as GFRP (glass fiber reinforced plastics) and CFRP (carbon fiber reinforced plastics).

In this example, rotor 11 (including projection 111) is formed of a magnetic material. When a normal conducting coil is used for magnetic flux generating part 15 (coil 15c), rotor 11 is preferably formed of a magnetic material. On the other hand, when a superconducting coil is used, rotor 11 can be formed of either a magnetic material or a non-magnetic material. When a superconducting coil is used, the generated magnetic field may be limited due to magnetic flux saturation of rotor 11. Therefore, rotor 11 is preferably formed of a non-magnetic material in some cases.

(Heating Part)

Heating part 13 is a tubular member disposed to be opposed to rotor 11 at a distance and provided on the outer circumference side of rotor 11. Heating part 13 is disposed to be opposed to rotor 11 at a distance in the radial direction and fixed to a casing (not shown) so as not to move. In heating part 13, magnetic flux generated by magnetic flux generating part 15 passes through to cause eddy current as described later, and heating part 13 generates heat by induction heating. Heating part 13 is made of a conductive material, for example, a metal such as iron, aluminum and copper or an alloy thereof.

(Magnetic Flux Generating Part)

Magnetic flux generating part 15 is provided at rotor 11 and generates magnetic flux for heating part 13. In this example, magnetic flux generating part 15 is provided on the outer circumference of rotor 11 so as to be opposed to heating part 13 to generate magnetic flux in the radial direction of rotor 11 (the direction of heating part 13). Specifically, a coil 15c is used as magnetic flux generating part 15, and coil 15c (six, in total) is wound around each projection 111 of rotor 11. When projection 111 is formed of a magnetic material, coil 15c and projection 111 constitute magnetic flux generating part 15. The outer diameter of each projection 111 in rotor 11 is smaller by one level on the other side than on one side in the axial direction. As described later, the distance between the tip surface of projection 111 that forms magnetic flux generating part 15 and heating part 13 varies in the axial direction, and the distance is larger on the outlet 172 side than on the inlet 171 side of flow passage 17 (see FIG. 1). A direct current power source (not shown) is connected to each coil 15c, and the direction of current supplied to each coil 15c is controlled so that the direction of a magnetic field (magnetic flux) to be produced is determined and the polarities of adjacent coils 15c are different from each other (see FIG. 2). An external power supply is connected to coil 15c, for example, through a slip ring to supply current.

As magnetic flux generating part 15, a permanent magnet may be used in place of a coil (electromagnet). Examples of the coil include a normal conducting coil of copper wire and a superconducting coil formed of a superconducting wire material. In the case of a coil, a strong magnetic field can be generated by increasing current to be supplied to the coil, and the strength of the magnetic field can be adjusted by controlling the supplied current. Since the amount of heat generation by induction heating (eddy current) is proportional to the square of the magnetic field strength, the coil can easily improve the amount of heat generation, compared with a permanent magnet. With a coil, reduction in magnetic characteristics due to temperature increase and degradation in magnetic characteristics over time are less likely to occur, compared with a permanent magnet. Therefore, when a coil is used for magnetic flux generating part 15, a sufficient magnetic field strength is easily kept by increasing the supplied current, and performance (thermal energy) sufficient for heating a heating medium to a predetermined temperature (for example, 100° C. to 600° C., preferably 200° C. to 350° C.) suitable for power generation is easily obtained. For example, direct current may be fed to the coil to generate a direct current magnetic field. When direct current is fed to a coil to generate a direct current magnetic field, a superconducting coil whose electric resistance is zero can be used so that substantially no heat generation (loss) occurs in the coil even when large current is fed. Therefore, compared with a normal conducting coil, heat generation (loss) in the coil caused by feeding large current can be suppressed, and an extremely strong magnetic field can be kept with no power loss. In this example, each coil 15c is a superconducting coil covered with a cooling jacket (not shown) around the periphery thereof and kept in a superconducting state by cooling. It is needless to say that a normal conducting coil may be used for coil 15c, or a permanent magnet may be used in place of coil 15c.

(Flow Passage)

Heating part 13 is provided with flow passage 17 through which a heating medium circulates (see FIG. 1). Flow passage 17 is provided along heating part 13 and has an inlet 171 to supply a heating medium on one side in the direction along heating part 13 and an outlet 172 to discharge the heating medium on the other side, so that the heating medium circulates from one side to the other side in the direction along heating part 13. In this example, inlet 171 is provided on one side in the axial direction of heating part 13 and outlet 172 is provided on the other side in the axial direction thereof, so that a heating medium circulates from one side to the other side in the axial direction of heating part 13 (in FIG. 1, from the left side to the right side) (the white arrows in FIG. 1 show the direction of supply/discharge of the heating medium).

Flow passage 17 is arranged spirally in the axial direction of heating part 13. In this example, flow passage 17 is configured with piping 17p, and piping 17p is disposed to be wound spirally around the outer circumference of heating part 13. Heating part 13 and flow passage 17 (piping 17p) are thermally connected. Flow passage 17 (piping 17p) is formed such that the distance between adjacent flow passage 17 (piping 17p) is equal. Specifically, flow passage 17 (piping 17p) is provided spirally approximately at equal pitch in the axial direction (the direction of circulation of the heating medium) of heating part 13, and the spiral pitch is substantially constant from the inlet 171 side to the outlet 172 side. Therefore, the contact area with heating part 13 is approximately equal from the inlet 171 side to the outlet 172 side of flow passage 17, and in heating part 13, the contact area with flow passage 17 per unit length in the axial direction (the direction of circulation of the heating medium) is approximately equal from the inlet 171 side to the outlet 172 side. Piping 17p is formed of, for example, metal such as iron, aluminum, and copper or an alloy thereof. Examples of the heating medium include water, water vapor, oil, liquid metal (Na, Pb, for example), liquid such as molten salt, and gas.

The mechanism by which the heating medium in induction heating device 101 is heated will now be described.

In induction heating device 101, magnetic flux is produced in the radial direction of rotor 11 from magnetic flux generating part 15 (coil 15c), and the magnetic flux passes through in heating part 13. In the region of heating part 13 opposed to magnetic flux generating part 15 where linkage of magnetic flux of magnetic flux generating part 15 occurs, a large amount of magnetic flux passes and the strength of the magnetic field increases. On the other hand, in the region of heating part 13 not opposed to magnetic flux generating part 15 where linkage of magnetic flux of magnetic flux generating part 15 does not occur, the amount of magnetic flux passing through decreases and the strength of magnetic field decreases. Then, when magnetic flux generating part 15 rotates with rotor 11, magnetic flux generating part 15 moves relative to heating part 13 whereby the magnetic flux passing through over the entire circumference of heating part 13 changes, and the magnetic field applied to heating part 13 periodically changes. As a result, eddy current occurs in heating part 13 to cause heating part 13 to generate heat, which is transferred to the heating medium flowing through flow passage 17 (piping 17$p$) to heat the heating medium. In this example, the outer diameter of each projection 111 is reduced by one level on the outlet 172 side of flow passage 17, and the distance between projection 111 that forms magnetic flux generating part 15 and heating part 13 is larger on the outlet 172 side than on the inlet 171 side of flow passage 17. Thus, the amount of heat generation of the portion of heating part 13 with a larger distance from magnetic flux generating part 15, that is, on the outlet 172 side is small. In other words, in heating part 13, the amount of heat generation per unit length in the direction of circulation of the heating medium is smaller on the outlet 172 side than on the inlet 171 side.

In induction heating device 101, since the polarities of adjacent magnetic flux generating parts 15 (coils 15$c$) are different from each other, the direction of magnetic flux (magnetic field) differs between when magnetic flux generating part 15 of the north pole is opposed and when magnetic flux generating part 15 of the south pole is opposed. When magnetic flux generating part 15 of the north pole is opposed, the direction of magnetic flux (magnetic field) is from the inner circumference side to the outer circumference side of heating part 13 (the + direction in the radial direction). On the other hand, when magnetic flux generating part 15 of the south pole is opposed, the direction of magnetic flux (magnetic field) is from the outer circumference side to the inner circumference side of heating part 13 (the − direction in the radial direction). That is, magnetic flux generating part 15 rotates together with rotor 11 whereby the direction of magnetic flux (magnetic field) periodically changes while reversing.

Here, in induction heating device 101, even when all the polarities of magnetic flux generating parts 15 (coils 15$c$) are the same (for example, the north pole), as described above, the magnetic field is stronger in a portion of heating part 13 opposed to magnetic flux generating part 15, and the magnetic field is weaker in another portion of heating part 13 opposed to the gap between adjacent magnetic flux generating parts 15. Therefore, since magnetic flux generating part 15 rotates together with rotor 11 to cause the strength of the magnetic field to periodically change, eddy current occurs in heating part 13, and heating part 13 is induction-heated. It is noted that in this case, the direction of magnetic field is not reversed. When the polarities of adjacent magnetic flux generating parts 15 are different from each other, the direction of magnetic field is reversed. Consequently, the amplitude (change) of the magnetic field applied to heating part 13 increases, and therefore larger eddy current can be produced and the amount of heat generation can be increased.

The number of magnetic flux generating parts 15 (coils 15$c$) can be set as appropriate. Here, the cycle of the magnetic field can be shortened by increasing the number of magnetic flux generating parts 15 to some extent. Since the amount of heat generation by induction heating is proportional to the frequency of the magnetic field, increase of the amount of heat generation can be expected by shortening the cycle of the magnetic field. The number of magnetic flux generating parts 15 is, for example, preferably four or more, six or more, more preferably eight or more.

{Operation Effects}

In induction heating device 101 of the first embodiment, flow passage 17 is configured such that the distance between magnetic flux generating part 15 and heating part 13 is larger on the outlet 172 side than on the inlet 171 side of flow passage 17. Thus, the amount of heat generation of heating part 13 can be suppressed on the outlet 172 side of flow passage 17 where the distance between magnetic flux generating part 15 and heating part 13 is large. Therefore, compared with when the distance between the tip surface of projection 111 that forms magnetic flux generating part 15 and heating part 13 is uniform in the axial direction, the temperature difference between heating part 13 and the heating medium can be increased on the outlet 172 side of flow passage 17. Accordingly, on the outlet 172 side of flow passage 17 where the amount of heat transfer from heating part 13 to the heating medium is reduced, heat generated in heating part 13 can be sufficiently transferred to the heating medium. Thus, heat generated in heating part 13 can be efficiently transferred to the heating medium circulating through flow passage 17, and heat loss from heating part 13 on the outlet 172 side is small, thereby improving the heating efficiency (heat exchange efficiency). In addition, heat generated in heating part 13 on the outlet 172 side can be sufficiently removed by the heating medium, thereby suppressing damage to heating part 13 due to overheating, without size increase or cost increase of the device.

Since flow passage 17 is provided spirally on the tubular heating part 13, heat generated from the entire heating part 13 can be transferred to the heating medium with a single flow passage 17.

[Modification]

In induction heating device 101 of the first embodiment illustrated above, each projection 111 provided on rotor 11 has a level in the axial direction, whereby the distance between the tip surface of projection 111 and heating part 13 is increased on the outlet 172 side of flow passage 17. Another means for increasing the distance between magnetic flux generating part 15 and heating part 13 is, for example, a level provided on the opposed surface (here, the inner circumferential surface) of heating part 13 opposed to rotor 11 (magnetic flux generating part 15). Specifically, the outer diameter of each projection 111 is made substantially constant, while the inner circumferential surface of heating part 13 is provided with a level in the axial direction such that the inner diameter of heating part 13 on the outlet 172 side is larger than that on the inlet 171 side. Thus, the distance between magnetic flux generating part 15 and heating part 13 can be increased on the outlet 172 side. In place of a level, a slope may be provided. The distance between magnetic flux generating part 15 and heating part 13 may be continuously increased by providing a slope, rather than being increased stepwise by providing a level from the inlet 171 side toward the outlet 172 side of flow passage 17.

(Insulating Material)

Figure 3:
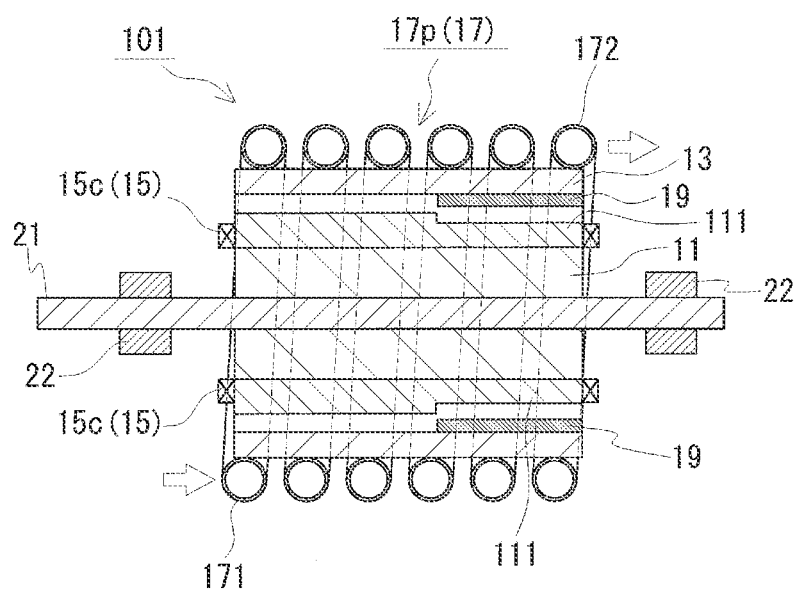
FIG. 3 is a schematic longitudinal cross-section view showing an example in which a heat insulating material is disposed in the heating part in the induction heating device according to the first embodiment.

In induction heating device 101 of the first embodiment, as illustrated in FIG. 3, an insulating material 19 may be disposed on the periphery of heating part 13 or piping 17$p$. The insulating material may be provided, for example, on the inner circumferential surface and the end surface of the heating part 13 or the outside of piping 17p. As an insulating material, for example, rock wool, glass wool, foamed plastic, brick, or ceramic can be used. The provision of an insulating material on the periphery of heating part 13 or piping 17p can suppress heat loss from heating part 13 or piping 17p and improve the efficiency of heat exchange to the heating medium. As shown in FIG. 3, insulating material 19 can be disposed on the opposed surface (here, inner circumferential surface) of heating part 13 opposed to rotor 11 (magnetic flux generating part 15) to reduce the effect of heat from heating part 13 on rotor 11 (magnetic flux generating part 15). The insulating material may be disposed on the opposed surface (here, outer circumferential surface) of rotor 11 (magnetic flux generating part 15) opposed to heating part 13 to reduce the effect of heat from heating part 13 as well.

In particular, in induction heating device 101 of the first embodiment, since the distance between projection 111 and heating part 13 is large on the outlet 172 side of flow passage 17, insulating material 19 (see FIG. 3) can be easily disposed in the portion with a large distance, or the thickness of insulating material 19 to be disposed can be easily increased. On the outlet 172 side of flow passage 17, heat loss is likely to occur because the temperature of the heating medium is high and the temperature of heating part 13 also tends to be high. However, heat loss can be effectively suppressed by disposing insulating material 19 on the outlet 172 side of flow passage 17 or increasing the thickness of insulating material 19.

Figure 4:
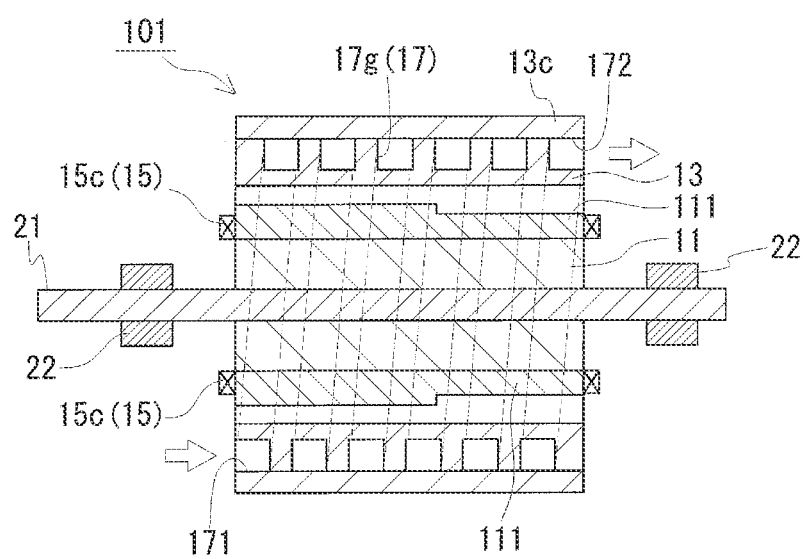
FIG. 4 is a schematic longitudinal cross-section view showing a modification of the flow passage in the induction heating device according to the first embodiment.

In induction heating device 101 of the first embodiment illustrated above, flow passage 17 is configured with piping 17p, and flow passage 17 is provided on the exterior of heating part 13. Alternatively, flow passage 17 may be formed in heating part 13. For example, as shown in FIG. 4, a spiral groove 17g may be formed in the axial direction in the outer circumferential surface of heating part 13, and this groove 17g may be used as flow passage 17. A sheet-shaped or tubular cover member 13c is then put on so as to cover the outer circumferential surface of heating part 13 having groove 17g, whereby flow passage 17 can be formed by a space surrounded by the inner circumferential surface of groove 17g and the inner circumferential surface of cover member 13c.

In induction heating device 101 of the first embodiment illustrated above, flow passage 17 is provided spirally in the axial direction of heating part 13. Alternatively, flow passage 17 may be provided linearly along the axial direction of heating part 13. In this case, a plurality of flow passage 17 may be provided at regular intervals in the circumferential direction of heating part 13.

[Modification 1-1]

In the first embodiment illustrated above, as shown in FIG. 1 and FIG. 4, the pitch of the spiral of flow passage 17 is constant, and flow passage 17 is formed such that the contact area with heating part 13 is equal from the inlet 171 side to the outlet 172 side. In Modification 1-1, referring to FIG. 5, an embodiment in which flow passage 17 is provided spirally in the axial direction of heating part 13 and the contact area with heating part 13 is larger on the outlet 172 side than on the inlet 171 side will be described. The top view in FIG. 5 shows flow passage 17 formed with piping 17p in the same manner as in FIG. 1, and the bottom view shows flow passage 17 formed with groove 17g formed in heating part 13 in the same manner as in FIG. 4.

Figure 5:
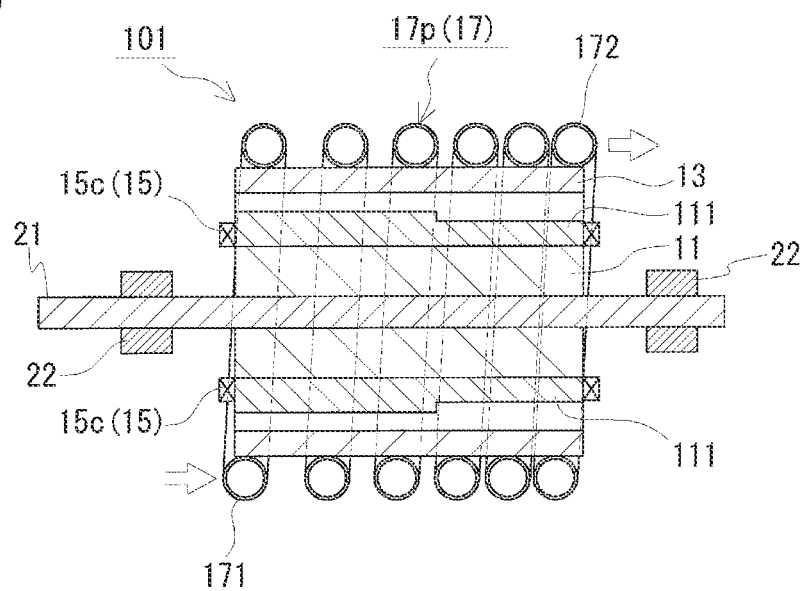
FIG. 5 is a schematic longitudinal cross-section view showing a configuration of the induction heating device according to Modification 1-1.
Figure 5:
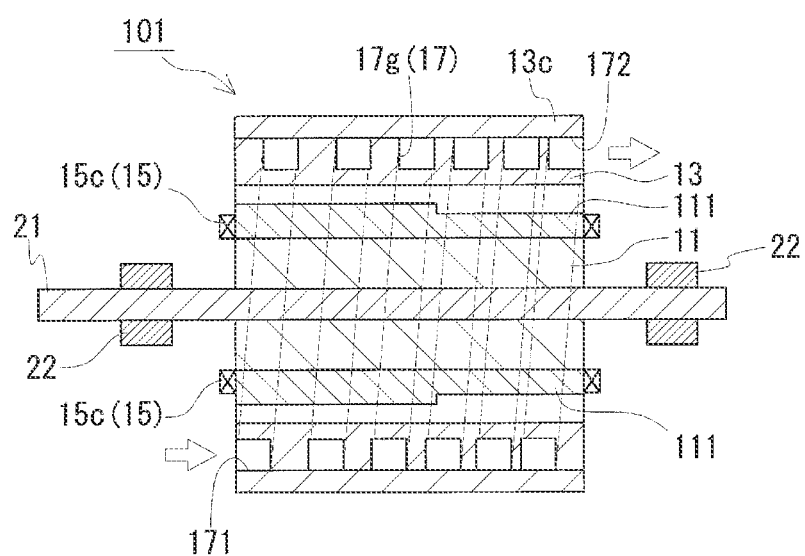

In induction heating device 101 according to Modification 1-1 illustrated in FIG. 5, flow passage 17 (piping 17p or groove 17g) is formed such that the distance between adjacent flow passage 17 is smaller on the outlet 172 side than on the inlet 171 side. Specifically, the pitch of the spiral of flow passage 17 decreases from the inlet 171 side toward the outlet 172 side of flow passage 17, and flow passage 17 is densely provided for heating part 13. Accordingly, the contact area with heating part 13 is larger on the outlet 172 side than on the inlet 171 side of flow passage 17, and in heating part 13, the contact area with flow passage 17 per unit length in the axial direction is larger on the outlet 172 side than on the inlet 171 side.

In induction heating device 101 of Modification 1-1, flow passage 17 is configured such that the contact area with heating part 13 is larger on the outlet 172 side than on the inlet 171 side of flow passage 17. Thus, the amount of heat transfer from heating part 13 to the heating medium flowing through flow passage 17 can be increased on the outlet 172 side of flow passage 17. Accordingly, on the outlet 172 side of flow passage 17, heat generated in heating part 13 can be sufficiently transferred to the heating medium, thereby further improving the heat exchange efficiency. Therefore, heat generated in heating part 13 can be transferred even more efficiently to the heating medium circulating through flow passage 17.

Figure 6:
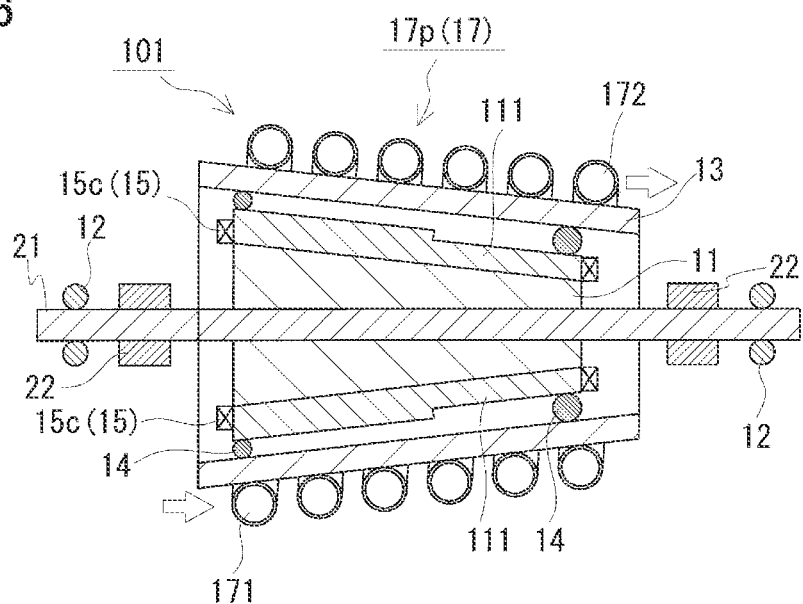
FIG. 6 is a schematic longitudinal cross-section view showing a modification of the rotor and the heating part in the induction heating device according to the first embodiment.
Figure 6:
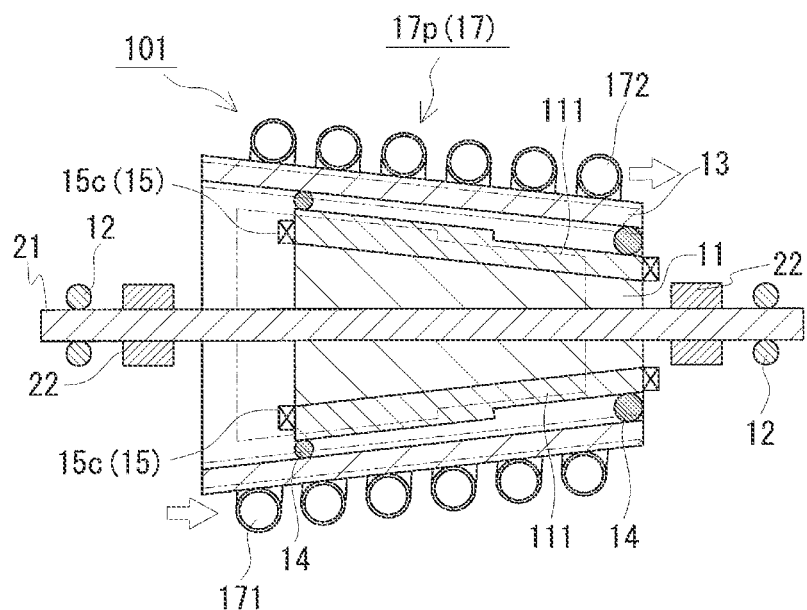

In induction heating device 101 of the first embodiment illustrated above, rotor 11 is cylindrical and heating part 13 is cylindrical. However, the shape of rotor 11 and heating part 13 is not limited thereto. For example, as shown in FIG. 6, the outer circumferential surface of rotor 11 may have a conical surface, and the inner circumferential surface of heating part 13 opposed thereto may also have a conical surface. Specifically, rotor 11 is shaped like a circulate truncated cone with the outer diameter decreasing from one side toward the other side in the axial direction (from the left side to the right side in FIG. 6) and has a conical outer circumferential surface. The outer diameter of each projection 111 in rotor 11 also decreases from one side toward the other side in the axial direction. On the other hand, heating part 13 is shaped like a circular truncated cone tube with the inner diameter decreasing from one side toward the other side in the axial direction and has a conical inner circumferential surface corresponding to the outer circumferential surface of rotor 11. The outer circumferential surface of rotor 11 and the inner circumferential surface of heating part 13 have approximately the same inclination angle, and the distance between magnetic flux generating part 15 (projection 111) and heating part 13 is larger on the outlet 172 side than on the inlet 171 side of flow passage 17 in the same manner as in induction heating device 101 shown in FIG. 1. Heating part 13 is formed such that its length in the axial direction is longer relative to rotor 11.

Furthermore, induction heating device 101 illustrated in FIG. 6 includes an axial movement mechanism 12 that moves at least one of rotor 11 and heating part 13 in the axial direction. In this example, axial movement mechanism 12 moves rotor 11 relative to heating part 13 in the axial direction. As a drive source for axial movement mechanism 12, an electric motor, an electric actuator, or a hydraulic cylinder may be used. In addition, a distance holding member (for example, bearing) 14 for holding a constant distance between magnetic flux generating part 15 (projection 111) and heating part 13 is interposed between rotor 11 and heating part 13 around the circumferential direction.

When heating part 13 generates heat by induction heating and becomes hot, heating part 13 may be thermally expanded outward in the radial direction. The thermal expansion may increase the inner diameter of heating part 13 and increase the distance between magnetic flux generating part 15 (projection 111) and heating part 13. The amount of heat generation by induction heating is proportional to magnetic field strength and magnetic field strength attenuates with distance. Given this, when the inner diameter of heating part 13 is increased due to thermal expansion, the distance from magnetic flux generating part 15 increases and the amount of heat generation in the entire heating part 13 decreases.

The top view in FIG. 6 shows a state in which heating part 13 is not thermally expanded, and the bottom view shows a state in which heating part 13 is thermally expanded. In the bottom view in FIG. 6, rotor 11 before move and heating part 13 before thermal expansion are each shown by a dashed and double-dotted line. Induction heating device 101 illustrated in FIG. 6 is configured such that rotor 11 is positioned at the center in the axial direction relative to heating part 13 and to have a predetermined distance between magnetic flux generating part 15 and heating part 13, in a state in which heating part 13 is not thermally expanded, as shown in the top view. Then, when heating part 13 is thermally expanded and the inner diameter is increased, as shown in the bottom view in FIG. 6, rotor 11 is moved in the axial direction relative to heating part 13 in a direction in which the distance between magnetic flux generating part 15 and heating part 13 decreases. Specifically, axial movement mechanism 12 moves rotor 11 to the other side in the axial direction (the right side in FIG. 6) relative to heating part 13. Thus, even when heating part 13 is thermally expanded, magnetic flux generating part 15 and heating part 13 can be adjusted to have a predetermined distance therebetween. Accordingly, the distance between magnetic flux generating part 15 and heating part 13 can be fixed before and after thermal expansion of heating part 13, thereby suppressing reduction of the amount of heat generation in the entire heating part 13 due to thermal expansion. When the degree of thermal expansion of heating part 13 is reduced, for example, when the amount of heat generation of heating part 13 is reduced, for example, because of reduction of the number of revolutions of rotor 11, axial movement mechanism 12 moves rotor 11 to one side in the axial direction (the left side in FIG. 6) relative to heating part 13. This can suppress excessive compressive stress acting on distance holding member 14.

In addition, in induction heating device 101 illustrated in FIG. 6, axial movement mechanism 12 can move rotor 11 in the axial direction relative to heating part 13 and can adjust the distance between magnetic flux generating part 15 and heating part 13 as desired. Therefore, in addition to fixing the distance between magnetic flux generating part 15 and heating part 13 before and after thermal expansion of heating part 13, the distance between magnetic flux generating part 15 and heating part 13 can be actively changed to adjust the amount of heat generation in the entire heating part 13. For example, the amount of heat generation in the entire heating part 13 can be reduced from the state shown in the top view in FIG. 6 in the direction in which the distance between magnetic flux generating part 15 and heating part 13 increases, that is, by moving rotor 11 to one side (the left side in FIG. 6) in the axial direction relative to heating part 13. On the other hand, the amount of heat generation in the entire heating part 13 can be increased in the direction in which the distance between magnetic flux generating part 15 and heating part 13 decreases, that is, by moving rotor 11 to the other side (the right side in FIG. 6) in the axial direction relative to heating part 13. Accordingly, in induction heating device 101 illustrated in FIG. 6, the distance between magnetic flux generating part 15 and heating part 13 can be adjusted as desired by moving rotor 11 in the axial direction relative to heating part 13, and the amount of heat generation in the entire heating part 13 also can be adjusted. When the distance between magnetic flux generating part 15 and heating part 13 is actively changed, the amount of movement of rotor 11 to the other side in the axial direction may be restricted by distance holding member 14. Thus, in this case, distance holding member 14 may be eliminated.

Second Embodiment

In the first embodiment above, a radial gap-type structure has been illustrated, in which magnetic flux generating part 15 and heating part 13 are disposed to be opposed to each other at a distance in the radial direction of rotor 11. In a second embodiment, an axial gap-type structure will be described, in which magnetic flux generating part 15 and heating part 13 are disposed to be opposed to each other at a distance in the axial direction of rotor 11. In the following, referring to FIG. 7 to FIG. 9, an induction heating device 102 according to the second embodiment will be described mainly focusing on the differences from the first embodiment.

(Rotor and Heating Part)

Figure 7:
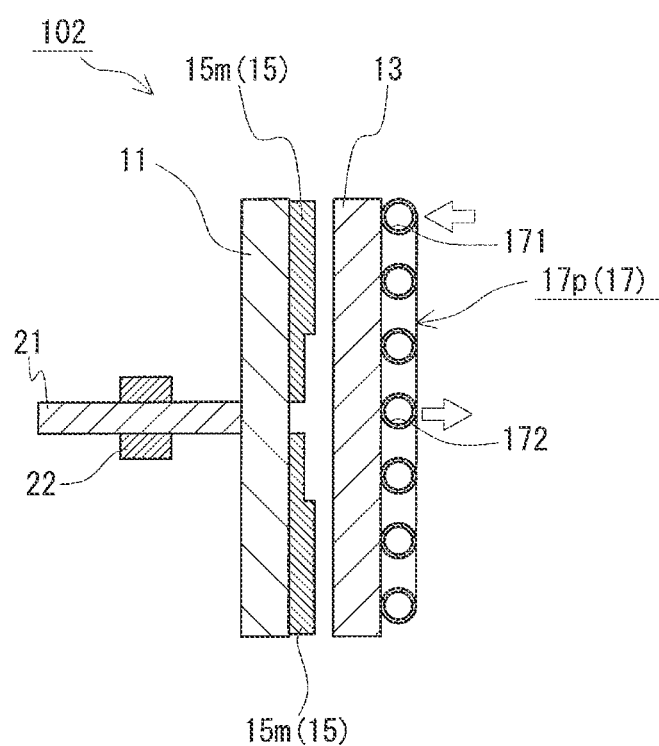
FIG. 7 is a schematic longitudinal cross-section view showing a configuration of an induction heating device according to a second embodiment.

Rotor 11 and heating part 13 are shaped like a plate (here, disc shape) and disposed with respective surfaces opposed to each other at a distance (see FIG. 7). Rotor 11 is coupled to one end side of rotation shaft 21 rotatably supported by bearing 22. Heating part 13 is disposed to be opposed to rotor 11 at a distance in the axial direction and is fixed to a casing (not shown) so as not to rotate.

(Magnetic Flux Generating Part)

Figure 8:
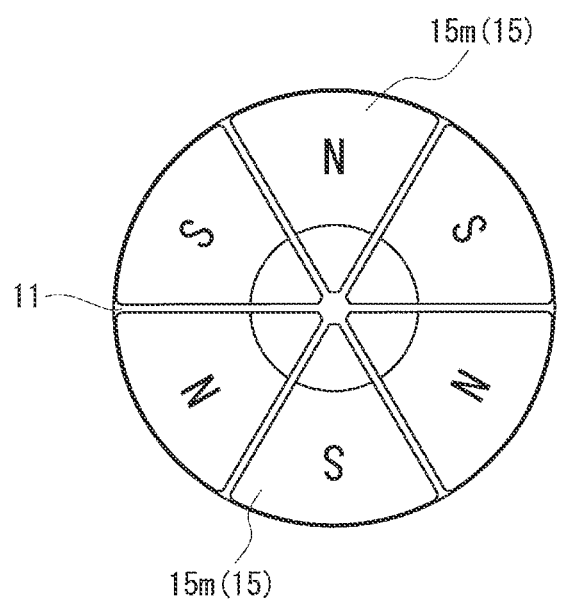
FIG. 8 is a schematic plan view showing a configuration of the magnetic flux generating part in the induction heating device according to the second embodiment.

On the opposed surface of rotor 11 opposed to heating part 13, magnetic flux generating part 15 is provided to generate magnetic flux in the axial direction (the direction of heating part 13) of rotor 11. In this example, magnetic flux generating part 15 is a permanent magnet 15m. As shown in FIG. 8, a plurality of sector-shaped magnets 15m are arranged in a circle on the opposed surface of rotor 11, and the polarities of adjacent magnets 15m are different from each other. Each magnet 15m is depressed by one level on the inside compared with the outside in the radial direction. As will be described later, the distance between each magnetic flux generating part 15 and heating part 13 varies in the radial direction, and the distance is larger on the outlet 172 side than on the inlet 171 side of flow passage 17 (see FIG. 7). Although FIG. 8 shows six magnetic flux generating parts 15 (magnets 15m) by way of illustration, the number of magnetic flux generating parts 15 (magnets 15m) is not limited thereto and can be set as appropriate. The number of magnetic flux generating parts 15 is, for example, four or more, six or more, more preferably eight or more. A coil may be used as magnetic flux generating part 15.

(Flow Passage)

Figure 9:
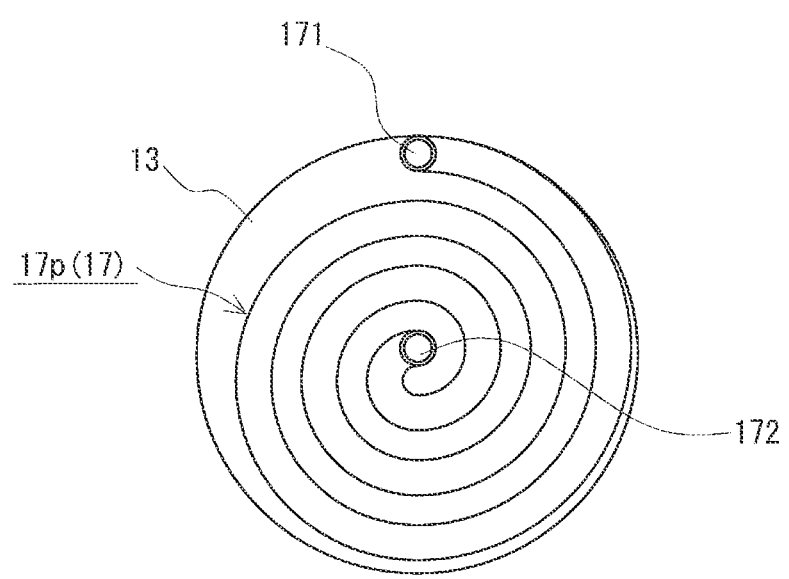
FIG. 9 is a schematic plan view showing a configuration of the flow passage in the induction heating device according to the second embodiment.

On the opposite surface of heating part 13 that is opposite to the opposed surface opposed to rotor 11, flow passage 17 is provided to allow a heating medium to circulate. In this example, flow passage 17 is provided in a swirl form in the radial direction of heating part 13, as shown in FIG. 9. Then, inlet 171 is provided on one side (here, the outside) in the radial direction of heating part 13, and outlet 172 is provided on the other side (here, the inside) in the radial direction thereof. A heating medium circulates from the outside to the inside in the radial direction of heating part 13 (the white arrows in FIG. 7 indicate the direction of supply/discharge of the heating medium). Flow passage 17 is configured with piping 17p, and piping 17p is disposed in a swirl form on the opposite surface of heating part 13. Flow passage 17 (piping 17p) is formed such that the distance between adjacent flow passage 17 (piping 17p) is equal. Specifically, flow passage 17 (piping 17p) is provided in a swirl form approximately at equal pitch in the radial direction of heating part 13 (the direction of circulation of the heating medium), and the pitch of the swirl (the distance between adjacent curves of the swirl that forms flow passage 17) is substantially constant from the inlet 171 side to the outlet 172 side. Accordingly, the contact area with heating part 13 is approximately equal from the inlet 171 side to the outlet 172 side of flow passage 17, and in heating part 13, the contact area with flow passage 17 per unit length in the radial direction (the direction of circulation of the heating medium) is approximately equal from the inlet 171 side to the outlet 172 side.

The mechanism by which the heating medium in induction heating device 102 is heated will now be described. In the case of induction heating device 102, magnetic flux is produced from magnetic flux generating part 15 (magnet 15m) in the axial direction of rotor 11, and the magnetic flux passes through in heating part 13. Specifically, at a portion in heating part 13 opposed to magnetic flux generating part 15 of the north pole, magnetic flux (magnetic field) passes in the direction from the opposed surface side to the opposite surface side of heating part 13. At a portion opposed to magnetic flux generating part 15 of the south pole, magnetic flux (magnetic field) passes in the direction from the opposite surface side to the opposed surface side of heating part 13. Then, when magnetic flux generating part 15 rotates together with rotor 11, magnetic flux generating part 15 moves relative to heating part 13 whereby the magnetic flux passing through at the portion of heating part 13 opposed to magnetic flux generating part 15 changes, and the magnetic field applied periodically changes. As a result, eddy current occurs in heating part 13 whereby heating part 13 generates heat, which is transferred to the heating medium flowing through flow passage 17 (piping 17p) to heat the heating medium. In this example, each magnet 15m that forms magnetic flux generating part 15 is depressed by one level on the outlet 172 side of flow passage 17, and the distance between each magnetic flux generating part 15 and heating part 13 is larger on the outlet 172 side than on the inlet 171 side of flow passage 17.

{Operation Effects}

In induction heating device 102 of the second embodiment, similar to induction heating device 101 of the first embodiment, flow passage 17 is configured such that the distance between magnetic flux generating part 15 and heating part 13 is larger on the outlet 172 side than on the inlet 171 side of flow passage 17. Thus, the amount of heat generation in heating part 13 can be suppressed on the outlet 172 side of flow passage 17, and the temperature difference between heating part 13 and the heating medium can be increased on the outlet 172 side of flow passage 17, compared with when the distance between magnetic flux generating part 15 and heating part 13 is uniform in the radial direction. Accordingly, heat generated in heating part 13 can be sufficiently transferred to the heating medium on the outlet 172 side of flow passage 17. Thus, heat generated in heating part 13 can be efficiently transferred to the heating medium circulating through flow passage 17, thereby improving the heat exchange efficiency, as in the first embodiment.

In addition, since flow passage 17 is provided in a swirl form on the plate-shaped heating part 13, heat generated from the entire heating part 13 can be transferred to the heating medium with a single flow passage 17.

[Modification]

In induction heating device 102 of the second embodiment illustrated above, each magnetic flux generating part 15 (magnet 15m) provided on rotor 11 has a level in the radial direction to increase the distance between magnetic flux generating part 15 and heating part 13 on the outlet 172 side of flow passage 17. Another means for increasing the distance between magnetic flux generating part 15 and heating part 13 is, for example, a level provided on the opposed surface of heating part 13 opposed to rotor 11. Specifically, the thickness of each magnet 15m is substantially constant in the radial direction, while a level is provided in the radial direction on the opposed surface of heating part 13 such that the opposing distance between rotor 11 (magnetic flux generating part 15) and heating part 13 is larger on the outlet 172 side than on the inlet 171 side. This can increase the distance between magnetic flux generating part 15 and heating part 13 on the outlet 172 side. In place of a level, a slope may be provided. The distance between magnetic flux generating part 15 and heating part 13 may be continuously increased by providing a slope, rather than being increased stepwise by providing a level from the inlet 171 side toward the outlet 172 side of flow passage 17.

(Insulating Material)

Figure 10:
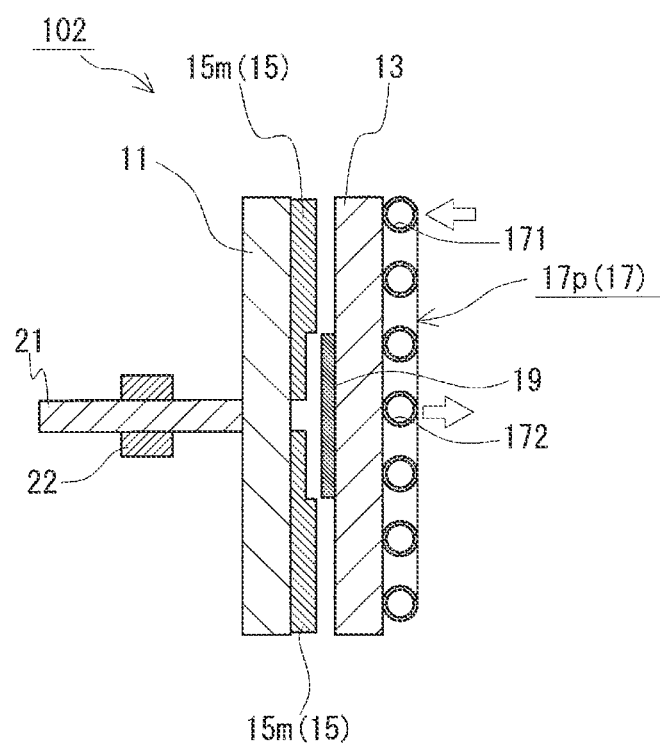
FIG. 10 is a schematic longitudinal cross-section view showing an example in which an insulating material is disposed in the heating part in the induction heating device according to the second embodiment.

In induction heating device 102 of the second embodiment, as illustrated in FIG. 10, insulating material 19 may be disposed on the periphery of heating part 13 or piping 17p in the same manner as in the first embodiment. The insulating material may be provided, for example, on the opposed surface and the circumferential surface of heating part 13 or on the outside of piping 17p. In FIG. 10, insulating material 19 is disposed at a portion where the distance from magnetic flux generating part 15 is large in the opposed surface of heating part 13, that is, on the outlet 172 side of flow passage 17. Alternatively, the insulating material may be disposed on the opposed surface of rotor 11 (magnetic flux generating part 15) opposed to heating part 13.

In induction heating device 102 of the second embodiment illustrated above, flow passage 17 is configured with piping 17p, and flow passage 17 is provided on the exterior of heating part 13. Alternatively, flow passage 17 may be formed in heating part 13 as in the first embodiment. For example, a swirl-shaped groove may be formed in the radial direction in the opposed surface or the opposite surface of heating part 13, and this groove may be used as a flow passage. Then, a plate-shaped cover member having openings at positions corresponding to the inlet and the outlet of the flow passage is put on so as to cover the surface of the heating part having the groove, whereby a flow passage can be formed by a space surrounded by the inner circumferential surface of the groove and the surface of the cover member.

[Modification 2-1]

In the second embodiment illustrated above, as shown in FIG. 7 and FIG. 9, the pitch of the swirl of flow passage 17 is constant, and flow passage 17 is formed such that the contact area with heating part 13 is constant from the inlet 171 side to the outlet 172 side. In Modification 2-1, referring to FIG. 11, flow passage 17 is provided spirally in the radial direction of heating part 13 and is formed such that the contact area with heating part 13 is larger on the outlet 172 side than on the inlet 171 side. The top view in FIG. 11 is a schematic longitudinal cross-section view of the induction heating device, similar to FIG. 7, and the bottom view is a schematic plan view of the flow passage, similar to FIG. 9.

Figure 11:
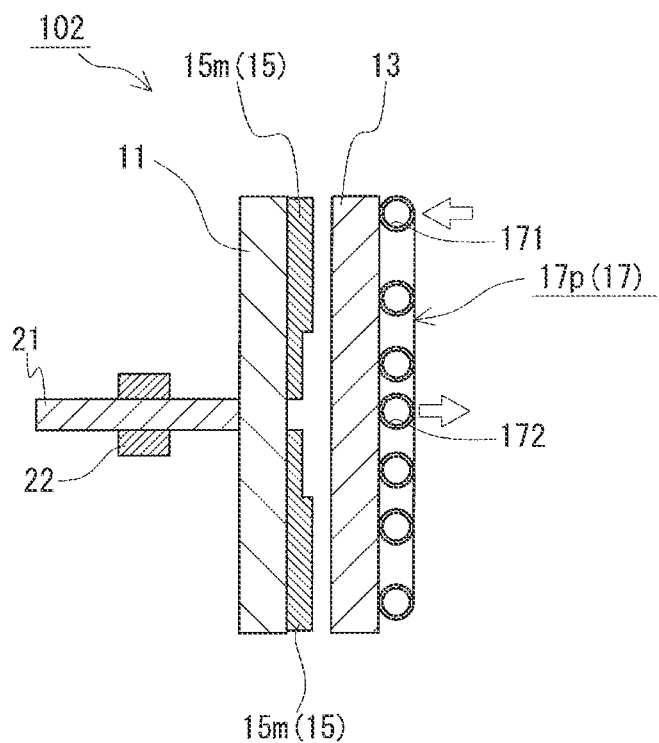
FIG. 11 is a schematic diagram showing a configuration of the induction heating device according to Modification 2-1.
Figure 11:
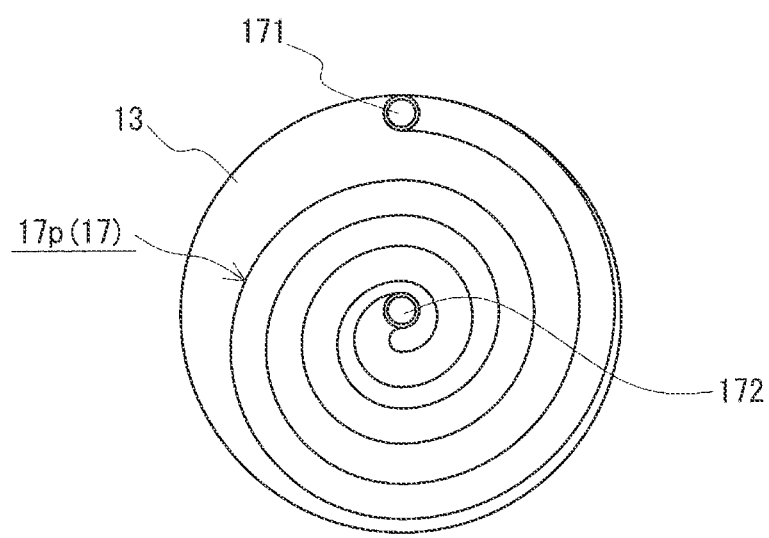

In induction heating device 102 according to Modification 2-1 illustrated in FIG. 11, flow passage 17 (piping 17p) is formed such that the distance between adjacent flow passage 17 (piping 17p) is smaller on the outlet 172 side than on the inlet 171 side. Specifically, the pitch of the swirl of flow passage 17 decreases from the inlet 171 side toward the outlet 172 side of flow passage 17, and flow passage 17 is densely provided for heating part 13. Accordingly, the contact area with heating part 13 is larger on the outlet 172 side than on the inlet 171 side of flow passage 17, and in heating part 13, the contact area with flow passage 17 per unit length in the radial direction is larger on the outlet 172 side than on the inlet 171 side.

In induction heating device 102 in Modification 2-1, flow passage 17 is configured such that the contact area with heating part 13 is larger on the outlet 172 side than on the inlet 171 side of flow passage 17 in the same manner as in induction heating device 101 in Modification 1-1 illustrated in FIG. 5. Accordingly, the amount of heat transfer from heating part 13 to the heating medium flowing through flow passage 17 can be increased on the outlet 172 side of flow passage 17, and heat generated in heating part 13 can be sufficiently transferred to the heating medium on the outlet 172 side of flow passage 17. Thus, heat generated in heating part 13 can be transferred even more efficiently to the heating medium circulating through flow passage 17, thereby improving the heat exchange efficiency, as in Modification 1-1.

Figure 12:
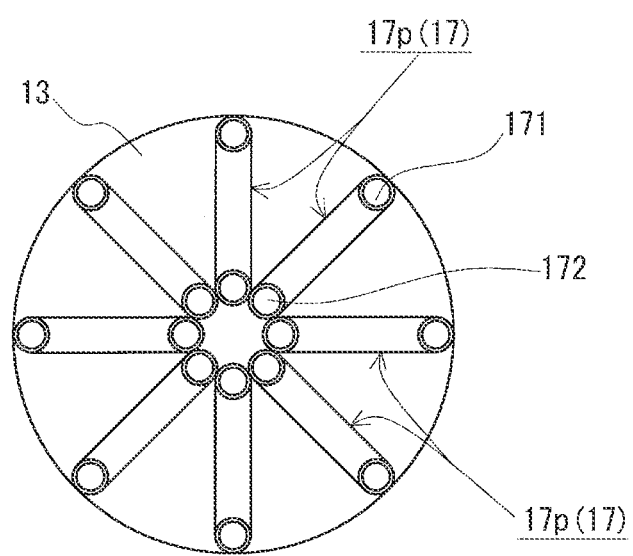
FIG. 12 is a schematic plan view showing a modification of the flow passage in the induction heating device according to Modification 2-1.

In induction heating device 102 in Modification 2-1 illustrated above, one flow passage 17 in a swirl form is provided for heating part 13. Alternatively, a plurality of flow passages may be provided. For example, as shown in FIG. 12, a plurality of flow passages 17 may be provided radially in the radial direction of heating part 13. Each flow passage 17 is provided linearly from the outside toward the inside in the radial direction of heating part 13. Inlet 171 is provided on the outside in the radial direction of heating part 13, and outlet 172 is provided on the inside in the radial direction thereof. In this example, each flow passage 17 is configured with piping 17p, and each piping 17p is disposed on the opposite surface of heating part 13. Also in this case, the distance between adjacent flow passages 17 (piping 17p) is smaller on the outlet 172 side than on the inlet 171 side of flow passage 17 (piping 17p), and therefore the contact area with heating part 13 is larger on the outlet 172 side than on the inlet 171 side of flow passage 17. Although FIG. 12 shows eight flow passages 17 (piping 17p) by way of illustration, the number of flow passages 17 (piping 17p) is not limited thereto and can be set as appropriate. The number of flow passages 17 may be, for example, four or more, eight or more, or twelve or more in view of ensuring the contact area with heating part 13. In FIG. 12, when heating part 13 is two-dimensionally viewed, flow passage 17 (piping 17p) is provided linearly in the radial direction of heating part 13. Alternatively, flow passage 17 (piping 17p) may be provided in the form of a wavy line.

[Others]

In induction heating devices 101, 102 in the forgoing first embodiment and second embodiment, the components of the device, namely, heating part 13, rotor 11, magnetic flux generating part 15, and others each may be one-piece or may be segmented in its circumferential direction, radial direction, or axial direction. For example, in the case of the radial gap-type induction heating device 101 as illustrated in FIG. 1, heating part 13 or rotor 11 may be segmented in the circumferential direction or the axial direction, or magnetic flux generating part 15 segmented in the axial direction may be disposed. For example, in the case of the axial gap-type induction heating device 102 as illustrated in FIG. 7, heating part 13, rotor 11, magnetic flux generating part 15, and others may be segmented in the circumferential direction or the radial direction. When heating part 13, rotor 11, and magnetic flux generating part 15 are segmented into pieces in the circumferential direction, the radial direction, or the axial direction, for example, the device may be segmented for fabrication, or the device may be segmented to facilitate transportation. In particular, in an induction heating device for use in a power generation system as described later, the device has a large size. Consequently, the size of the above-noted components is also large, and the number of revolutions of rotor 11 is low. In the case of a large-size induction heating device, when the components are segmented, the components are readily manufactured, the production costs of the components can be reduced, and the easiness of assembly of the device can be improved. This leads to, for example, reduction in manufacturing costs of the device. In the power generation system, if the number of revolutions of rotor 11 of the induction heating device is low, the margin of accuracy of rotor 11 is large, and the segmentation of rotor 11 is likely to be permissible.

<Power Generation System>

Figure 13:
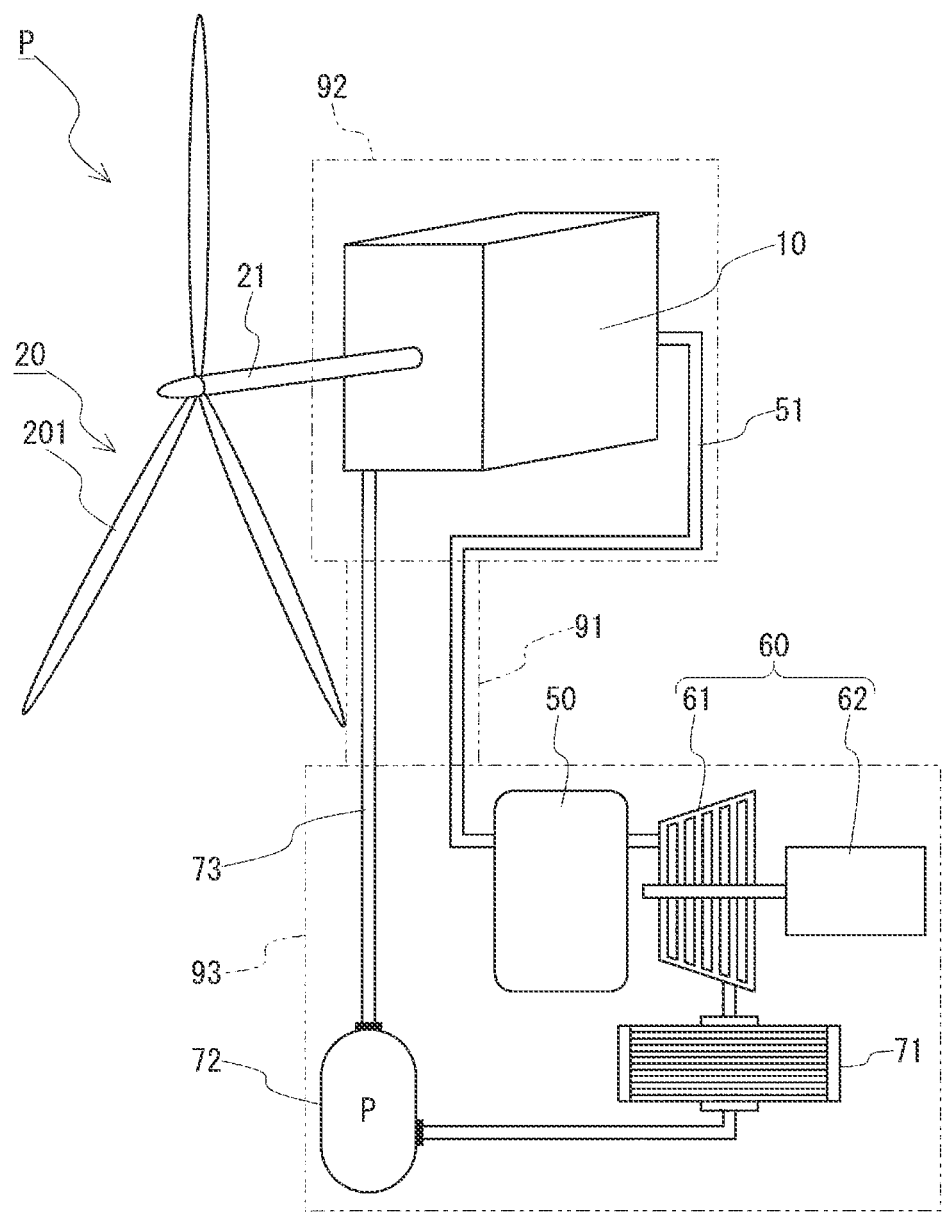
FIG. 13 is a schematic diagram showing an example of the overall configuration of a power generation system according to an embodiment of the present invention.

Referring to FIG. 13, an example of a power generation system according to an embodiment of the present invention will be described. A power generation system P shown in FIG. 13 includes an induction heating device 10, a wind turbine 20, a heat accumulator 50, and a power generating part 60. Wind turbine 20 is attached to a nacelle 92 installed on the top of a tower 91, and induction heating device 10 is stored in nacelle 92. Heat accumulator 50 and power generating part 60 are installed in a building 93 built on the bottom (base) of tower 91. The configuration of power generation system P will be described in detail.

Induction heating device 10 is the induction heating device according to an embodiment of the present invention and, for example, may be induction heating device 101, 102 according to the first embodiment or Modification 1-1, or the second embodiment or Modification 2-1. The other end side of rotation shaft 21 is directly coupled to wind turbine 20 described later, and wind is used as motive power for rotating the rotor. Here, the heating medium is water by way of example.

Wind turbine 20 has a structure in which rotation shaft 21 extending in the horizontal direction is set at the center and three blades 201 are radially attached to rotation shaft 21. In the case of a wind power generation system with an output exceeding 5 MW, the diameter is 120 m or more, and the number of revolutions is about 10 to 20 rpm.

The flow passage (piping) of induction heating device 10 is connected with a water supply pipe 73 for supplying water to induction heating device 10 and a transport pipe 51 for delivering water heated by induction heating device 10 to heat accumulator 50. Induction heating device 10 then produces magnetic flux from the magnetic flux generating part provided on the rotor, and when the rotor rotates, the magnetic flux passing through the heating part disposed at a distance from the rotor changes, thereby producing eddy current in the heating part to cause the heating part to generate heat and heat water in the flow passage. Induction heating device 10 heats water serving as a heating medium to, for example, high temperatures such as 100° C. to 600° C. Since induction heating device 10 is structured such that the heating part (flow passage) does not rotate, it is unnecessary to use a revolute joint for connecting the flow passage with transport pipe 51 and water supply pipe 73. Robust connection is implemented with a simple configuration, for example, using welding.

This power generation system P heats water to temperatures (for example 200° C. to 350° C.) suitable for power generation with induction heating device 10 and generates high-temperature and high-pressure water. The high-temperature and high-pressure water is delivered to heat accumulator 50 through transport pipe 51 coupling induction heating device 10 to heat accumulator 50. Heat accumulator 50 stores the heat of high-temperature and high-pressure water delivered through transport pipe 51 and supplies steam required for power generation to power generating part 60 using a heat exchanger. Alternatively, steam may be generated by induction heating device 10.

As heat accumulator 50, a steam accumulator, a sensible heat-type storage device that uses a molten salt, oil, or the like, or a latent heat-type storage device that utilizes phase change of a high-melting-point molten salt can be used, for example. The sensible heat-type storage method stores heat at a phase-change temperature of a heat storage material, and therefore, generally has a narrow band of heat storage temperatures as compared with the latent heat-type storage method, and exhibits a high heat storage density.

Power generating part 60 is a structure including steam turbine 61 and power generator 62 in combination, and steam supplied from heat accumulator 50 rotates steam turbine 61 to drive power generator 62 to generate power.

The high-temperature and high-pressure water or steam delivered to heat accumulator 50 is cooled by a condenser 71 back into water. The water is then delivered to a pump 72, which generates high-pressure water and delivers the high-pressure water to induction heating device 10 through water supply pipe 73, whereby water is circulated.

Since power generation system P includes induction heating device 10 according to an embodiment of the present invention, heat generated in the heating part can be efficiently transferred to the heating medium circulating through the flow passage in induction heating device 10. Therefore, the efficiency of heat exchange to the heating medium in induction heating device 10 can be improved, and the power generation efficiency can be improved. In addition, the heat of the heating medium heated by induction heating device 10 may be stored in heat accumulator 50 to generate power, whereby stable power generation to meet a demand can be realized without using expensive storage batteries. Furthermore, wind turbine 20 is directly coupled to rotation shaft 21 of induction heating device 10, thereby avoiding troubles with speed increasers (gear boxes). Moreover, since the heat of the heating medium is supplied to power generating part 60 installed on, for example, the bottom (base) of tower 91 through transport pipe 51, it is not necessary to store power generating part 60 in nacelle 92, so that nacelle 92 installed on the top of tower 91 can be reduced in size and weight.

In power generation system P illustrated above, water is used as a heating medium. Alternatively, liquid metal having a thermal conductivity higher than water may be used as a heating medium. An example of such a liquid metal is liquid metal sodium. When liquid metal is used as a heating medium, for example, liquid metal may be used as a primary heating medium receiving heat from the heating part, and a secondary heating medium (water) may be heated through a heat exchanger by the heat of the liquid metal delivered through the transport pipe heats to generate steam.

For example, when oil, liquid metal, molten salt, or the like having a boiling point exceeding 100° C. at normal pressures is used as a heating medium, the internal pressure increase caused by vaporization of the heating medium in the flow passage can be suppressed more easily when it is heated to a predetermined temperature, compared with water.

The following notes are further disclosed in connection with the embodiments of the present invention described above.

[Note 1]

An induction heating device that heats a heating medium, comprising:

a rotor having a rotation shaft;

a tubular heating part provided on an outer circumferential side of the rotor and disposed to be opposed to the rotor at a distance in a radial direction;

a magnetic flux generating part provided on an outer circumference of the rotor to generate magnetic flux in the radial direction of the rotor;

a flow passage provided along the heating part to allow the heating medium to circulate; and an axial movement mechanism configured to move the rotor in an axial direction relative to the heating part, wherein the rotor has a conical outer circumferential surface, and the heating part has a conical inner circumferential surface corresponding to the outer circumferential surface of the rotor.

In the induction heating device according to Note 1, the rotor is moved in the axial direction relative to the heating part, whereby the distance between the magnetic flux generating part and the heating part can be adjusted. Given that the amount of heat generation by induction heating is proportional to magnetic field strength and magnetic field strength is dependent on distance, the amount of heat generation of the entire heating part can be adjusted by changing the distance between the magnetic flux generating part and the heating part.

When the heating part generates heat by induction heating and becomes hot, the heating part may be thermally expanded outward in the radial direction. The thermal expansion may increase the inner diameter of the heating part and increase the distance between the magnetic flux generating part and the heating part. When the inner diameter of the heating part increases due to thermal expansion, the distance from the magnetic flux generating part increases, and the amount of heat generation in the entire heating part is reduced. In the induction heating device according to Note 1, even when the heating part is thermally expanded, the rotor is moved in the axial direction relative to the heating part, whereby the magnetic flux generating part and the heating part can be adjusted to have a predetermined distance therebetween. Accordingly, reduction of the amount of heat generation in the entire heating part due to thermal expansion can be suppressed.

[Note 2]

A power generation system comprising:

the induction heating device according to Note 1; and a power generating part configured to convert heat of the heating medium heated by the induction heating device into electric energy.

Since the power generation system according to Note 2 includes the induction heating device according to Note 1, the distance between the magnetic flux generating part and the heating part can be adjusted by moving the rotor in the axial direction relative to the heating part in the induction heating device. Therefore, the amount of heat generation in the entire heating part can be adjusted by changing the distance between the magnetic flux generating part and the heating part. For example, even when the heating part is thermally expanded and its inner diameter increases, the magnetic flux generating part and the heating part are adjusted to have a predetermined distance therebetween, whereby reduction of the amount of heat generation in the entire heating part due to thermal expansion can be suppressed.

The power generation system according to Note 2 generates power using heat of the heating medium heated by the induction heating device. For example, when a wind turbine is connected to the rotation shaft of the induction heating device and wind power is used as motive power for the rotor, wind energy can be converted into rotational energy and then into thermal energy, which can be extracted as electric energy. As an example, water serving as a heating medium is heated to generate high-temperature and high-pressure steam, which may be used to allow the steam turbine to rotate the power generator to generate power. With the configuration of converting heat into electric energy, a stable power generation system can be implemented by using a heat accumulator to store energy in the form of heat.

A specific example of the induction heating device according to Note 1 will be described below with reference to FIG. 14. Induction heating device 110 includes rotor 11, heating part 13, magnetic flux generating part 15, and flow passage 17. Induction heating device 110 is a radial gap-type structure in which magnetic flux generating part 15 and heating part 13 are disposed to be opposed to each other at a distance in the radial direction of rotor 11. The basic configuration of induction heating device 110 is similar to the configuration of induction heating device 101 according to the first embodiment illustrated above with reference to FIG. 1 and FIG. 2. In the following, the configuration similar to the configuration described in the first embodiment will be denoted by the same reference signs and will not be further elaborated, and the differences from the first embodiment will be mainly described.

(Rotor)

Rotor 11 has a conical outer circumferential surface. In this example, rotor 11 is shaped like a circulate truncated cone with the outer diameter decreasing from one side toward the other side in the axial direction (in FIG. 14, from the left side to the right side), and the outer circumferential surface has a conical surface. The outer diameter of each projection 111 in rotor 11 also decreases from one side toward the other side in the axial direction.

(Heating Part)

Heating part 13 has a conical inner circumferential surface corresponding to the outer circumferential surface of rotor 11. Specifically, it is shaped like a circulate truncated cone tube with the inner diameter decreasing from one side toward the other side in the axial direction, and the inner circumferential surface has a conical surface corresponding to the outer circumferential surface of rotor 11. The outer circumferential surface of rotor 11 and the inner circumferential surface of heating part 13 have approximately the same inclination angle, and the distance between rotor 11 (projection 111) and heating part 13 is set to a predetermined distance. In this example, heating part 13 is formed such that the length in the axial direction is long relative to rotor 11.

(Magnetic Flux Generating Part)

Magnetic flux generating part 15 is provided on the outer circumference of rotor 11 to generate magnetic flux in the radial direction of rotor 11 (the direction of heating part 13). In other words, magnetic flux generating part 15 generates magnetic flux for heating part 13. In this example, coil 15c is used as magnetic flux generating part 15, and coil 15c is wound around and attached to each projection 111 formed on the outer circumference of rotor 11. Projection 111 is formed of a magnetic material, and coil 15c and projection 111 constitute magnetic flux generating part 15. The distance between the tip surface of projection 111 that forms magnetic flux generating part 15 and heating part 13 is constant or almost constant in the axial direction.

(Flow Passage)

Flow passage 17 is provided in the axial direction of heating part 13. Flow passage 17 has inlet 171 to supply a heating medium on one side in the axial direction of heating part 13 and outlet 172 to discharge the heating medium on the other side in the axial direction thereof. The heating medium circulates from one side to the other side in the axial direction of heating part 13 (the white arrows in FIG. 14 indicate the direction of supply/discharge of the heating medium). In this example, flow passage 17 is provided spirally in the axial direction of heating part 13 and is configured with piping 17p. Flow passage 17 (piping 17p) is formed such that the distance between adjacent flow passage 17 (piping 17p) is equal. Specifically, flow passage 17 (piping 17p) is provided spirally at approximately equal pitch in the axial direction of heating part 13 (the direction of circulation of the heating medium). The pitch of the spiral is substantially constant from the inlet 171 side to the outlet 172 side.

Flow passage 17 may be provided, for example, linearly along the axial direction of heating part 13, rather than being provided spirally on heating part 13. In this case, a plurality of flow passages 17 may be provided at a distance from each other in the circumferential direction of heating part 13.

(Axial Movement Mechanism)

Induction heating device 110 further includes axial movement mechanism 12 that moves at least one of rotor 11 and heating part 13 in the axial direction. Axial movement mechanism 12 moves rotor 11 in the axial direction relative to heating part 13. As a drive source for axial movement mechanism 12, an electric motor or an electric actuator may be used, or a hydraulic cylinder or the like may be used.

In addition, distance holding member (for example, bearing) 14 for holding magnetic flux generating part 15 (projection 111) and heating part 13 at a constant distance from each other is interposed between rotor 11 and heating part 13 over the circumferential direction.

The operation effects of induction heating device 110 illustrated in FIG. 14 will be described with reference to the drawing. The top view in FIG. 14 shows a state in which heating part 13 is not thermally expanded, and the bottom view shows a state in which heating part 13 is thermally expanded. In the bottom view in FIG. 14, rotor 11 before move and heating part 13 before thermal expansion are each shown by a dashed and double-dotted line.

In induction heating device 110, when heating part 13 generates heat by induction heating and becomes hot, heating part 13 may be thermally expanded outward in the radial direction. Thus, the inner diameter of heating part 13 may increase due to thermal expansion, and the distance between magnetic flux generating part 15 (projection 111) and heating part 13 may increase. The amount of heat generation by induction heating is proportional to magnetic field strength and magnetic field strength attenuates with distance. Given this, when the inner diameter of heating part 13 increases due to thermal expansion, the distance from magnetic flux generating part 15 increases and the amount of heat generation in the entire heating part 13 decreases.

Figure 14:
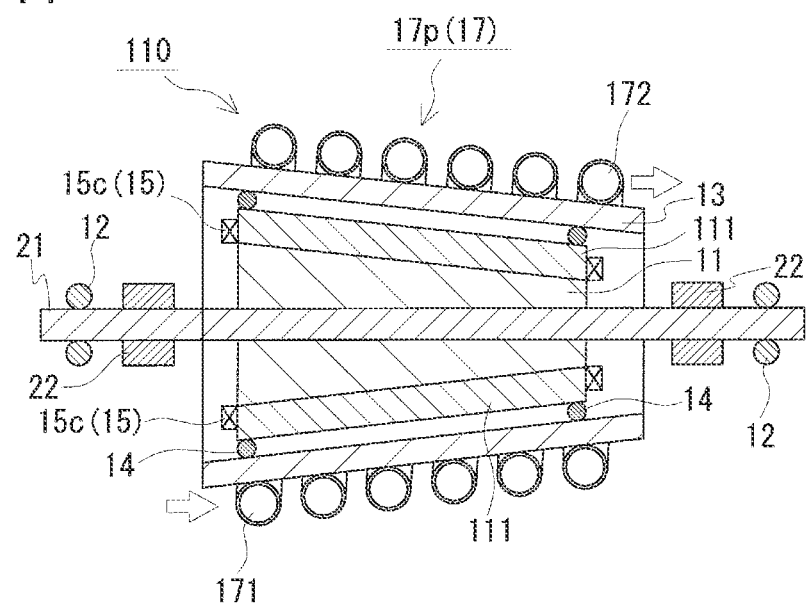
FIG. 14 is a schematic longitudinal cross-section view showing a configuration example of the induction heating device according to Note 1.
Figure 14:
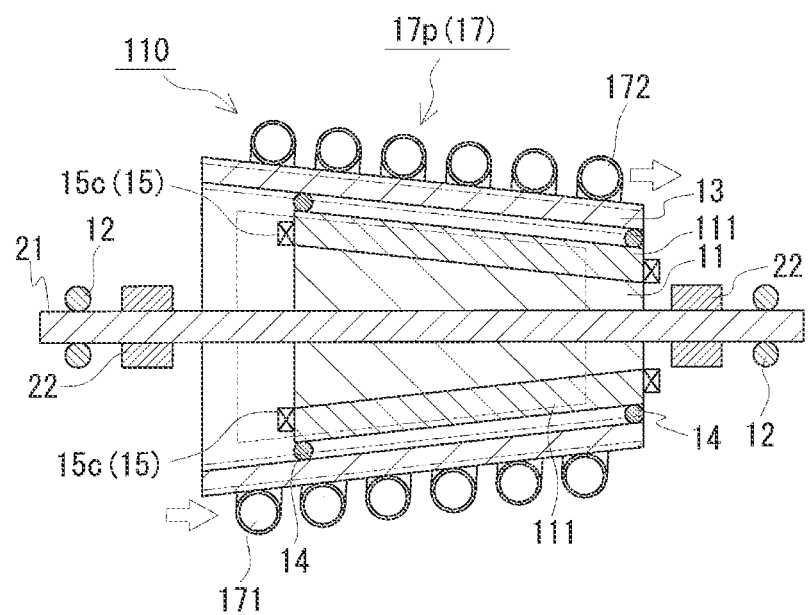

Induction heating device 110 is configured such that rotor 11 is positioned at the center in the axial direction relative to heating part 13 and magnetic flux generating part 15 and heating part 13 have a predetermined distance therebetween, in a state in which heating part 13 is not thermally expanded, as shown in the top view in FIG. 14. Then, when heating part 13 is thermally expanded and its inner diameter increases, as shown in the bottom view in FIG. 14, rotor 11 is moved in the axial direction relative to heating part 13 in the direction in which the distance between magnetic flux generating part 15 and heating part 13 decreases. Specifically, axial movement mechanism 102 moves rotor 11 to the other side in the axial direction (the right side in FIG. 14) relative to heating part 13. Thus, even when heating part 13 is thermally expanded, magnetic flux generating part 15 and heating part 13 can be adjusted to have a predetermined distance therebetween. Accordingly, the distance between magnetic flux generating part 15 and heating part 13 can be fixed before and after thermal expansion of heating part 13, and reduction of the amount of heat generation in the entire heating part 13 due to thermal expansion can be suppressed. When the degree of thermal expansion of heating part 13 decreases, for example, when the number of revolutions of rotor 11 is reduced and then the amount of heat generation in heating part 13 is reduced, axial movement mechanism 12 moves rotor 11 to one side in the axial direction (the left side in FIG. 14) relative to heating part 13. This can suppress excessive compressive stress acting on distance holding member 14.

In induction heating device 110, axial movement mechanism 12 allows rotor 11 to move in the axial direction relative to heating part 13, and the distance between magnetic flux generating part 15 and heating part 13 can be adjusted as desired. Therefore, in addition to fixing the distance between magnetic flux generating part 15 and heating part 13 before and after thermal expansion of heating part 13, the distance between magnetic flux generating part 15 and heating part 13 can be actively changed to adjust the amount of heat generation in the entire heating part 13. For example, the amount of heat generation in the entire heating part 13 can be reduced from the state shown in the top view in FIG. 14, in the direction in which the distance between magnetic flux generating part 15 and heating part 13 increases, that is, by moving rotor 11 to one side in the axial direction (the left side in FIG. 14) relative to heating part 13. On the other hand, the amount of heat generation in the entire heating part 13 can be increased in the direction in which the distance between magnetic flux generating part 15 and heating part 13 decreases, that is, by moving rotor 11 to the other side in the axial direction (the right side in FIG. 14) relative to heating part 13. Accordingly, in induction heating device 110, the distance between magnetic flux generating part 15 and heating part 13 can be adjusted as desired by moving rotor 11 in the axial direction relative to heating part 13, and the amount of heat generation in the entire heating part 13 also can be adjusted. When the distance between magnetic flux generating part 15 and heating part 13 is actively changed, the amount of movement to the other side in the axial direction of rotor 11 may be restricted by distance holding member 14. Thus, in this case, distance holding member 14 may be eliminated.

The configuration of the power generation system according to Note 2 differs from power generation system P described above with reference to FIG. 13 in that it includes the induction heating device according to Note 1. The other configuration may be similar to the configuration of power generation system P in FIG. 13 and will not be further elaborated here.

INDUSTRIAL APPLICABILITY

The induction heating device of the present invention can be used in a power generation system using renewable energy (for example, wind power) and also can be used, for example, in a hot water supply system or an air heating system. The power generation system of the present invention is suitably applied in the field of power generation using renewable energy.

REFERENCE SIGNS LIST 10, 101 to 102, 110: induction heating device; P: power generation system; 11: rotor; 111: projection; 12: axial movement mechanism; 13: heating part; 13c: cover member; 14: distance holding member; 15: magnetic flux generating part; 15c: coil; 15m: permanent magnet; 17: flow passage; 17p: piping; 17g: groove; 171: inlet; 172: outlet; 19: insulating material; 21: rotation shaft; 22: bearing; 20: wind turbine; 201: blade; 50: heat accumulator; 51: transport pipe; 60: power generating part; 61: steam turbine; 62: power generator; 71: condenser; 72: pump; 73: water supply pipe; 91: tower; 92: nacelle; 93: building.

The invention claimed is:

1. An induction heating device that heats a heating medium, comprising:
    a rotor having a rotation shaft;
    a heating part disposed to be opposed to said rotor at a distance;
    a magnetic flux generating part provided at said rotor to generate magnetic flux for said heating part; and
    a flow passage provided along said heating part to allow said heating medium to circulate, wherein
    said heating part is a tubular member provided on an outer circumferential side of said rotor,
    said magnetic flux generating part generates said magnetic flux in a radial direction of said rotor,
    said flow passage is provided spirally in an axial direction of said heating part and has an inlet to supply said heating medium on one side in said axial direction along said heating part and an outlet to discharge said heating medium on the other side, said inlet being provided on one side in the axial direction of said heating part, said outlet being provided on the other side,
    a distance between said magnetic flux generating part and said heating part is larger on said outlet side than on said inlet side of said flow passage, and
    said flow passage is formed such that a distance between adjacent said flow passage is smaller on said outlet side than on said inlet side.

2. The induction heating device according to claim 1, wherein said flow passage is formed such that a contact area with said heating part is larger on said outlet side than on said inlet side.

3. The induction heating device according to claim 1, wherein said rotation shaft is connected to a wind turbine.

4. A power generation system comprising:
    the induction heating device of claim 1; and
    a power generating part configured to convert heat of said heating medium heated by said induction heating device into electric energy.

5. An induction heating device that heats a heating medium, comprising:
    a rotor having a rotation shaft;
    a heating part disposed to be opposed to said rotor at a distance;

a magnetic flux generating part provided at said rotor to generate magnetic flux for said heating part; and a flow passage provided along said heating part to allow said heating medium to circulate, wherein said flow passage has an inlet to supply said heating medium on one side in a direction along said heating part and an outlet to discharge said heating medium on the other side, and said flow passage is formed such that a contact area with said heating part is larger on said outlet side than on said inlet side, and a distance between said magnetic flux generating part and said heating part is larger on said outlet side than on said inlet side of said flow passage.

6. The induction heating device according to claim 5, wherein said heating part is a tubular member provided on an outer circumferential side of said rotor, said magnetic flux generating part generates said magnetic flux in a radial direction of said rotor, and said flow passage is provided spirally in an axial direction of said heating part, said inlet being provided on one side in the axial direction of said heating part, said outlet being provided on the other side.

7. The induction heating device according to claim 5, wherein said rotation shaft is connected to a wind turbine.

8. A power generation system comprising:
the induction heating device of claim 5; and
a power generating part configured to convert heat of said heating medium heated by said induction heating device into electric energy.

9. The induction heating device according to claim 1, wherein said rotor has a conical outer circumferential surface and said heating part has a conical inner circumferential surface corresponding to said conical outer circumferential surface of said rotor, and the induction heating device further comprises an axial movement mechanism that moves at least one of said rotor and said heating part in said axial direction of said heating part.

10. The induction heating device according to claim 5, wherein said rotor has a conical outer circumferential surface and said heating part has a conical inner circumferential surface corresponding to said conical outer circumferential surface of said rotor, and the induction heating device further comprises an axial movement mechanism that moves at least one of said rotor and said heating part in said axial direction of said heating part.

* * * * *